United States Patent [19]
Kurosawa

[11] Patent Number: 5,250,887
[45] Date of Patent: Oct. 5, 1993

[54] FEEDBACK CONTROLLER

[75] Inventor: Ryoichi Kurosawa, Tokyo, Japan

[73] Assignee: Kabushiki Kaisha Toshiba, Kawasaki, Japan

[21] Appl. No.: 873,191

[22] Filed: Apr. 24, 1992

[30] Foreign Application Priority Data

Apr. 26, 1991 [JP]  Japan ................... 3-097371

[51] Int. Cl.⁵ .................. G05B 11/00; H02P 7/00
[52] U.S. Cl. ........................ 318/610; 318/609; 318/561; 318/608
[58] Field of Search ............... 318/560-636; 364/150-179; 388/910-922

[56] References Cited

U.S. PATENT DOCUMENTS

| | | | |
|---|---|---|---|
| 4,432,439 | 2/1984 | Caputo et al. | |
| 4,675,584 | 6/1987 | Karosawa | 318/434 X |
| 4,675,804 | 6/1987 | Wiemer | 318/609 X |
| 4,874,999 | 10/1989 | Kuwabara et al. | 318/610 |
| 4,894,599 | 1/1990 | Ottesen et al. | 318/561 X |
| 4,982,145 | 1/1991 | Peterson | 318/609 X |
| 5,105,138 | 4/1992 | Hiroi | 318/610 |
| 5,111,124 | 5/1992 | Kurosawa | 318/434 |

FOREIGN PATENT DOCUMENTS

| | | |
|---|---|---|
| 0417635 | 3/1991 | European Pat. Off. |
| 0417774 | 3/1991 | European Pat. Off. |
| 269240 | 6/1989 | German Democratic Rep. |
| 3100801 | 4/1991 | Japan . |

OTHER PUBLICATIONS

O. J. M. Smith: "Feedback Control Systems" No. 107, 1958, McGraw-Hill, New York, pp. 341-345.

Primary Examiner—Paul Ip
Attorney, Agent, or Firm—Oblon, Spivak, McClelland, Maier & Neustadt

[57] ABSTRACT

A feedback controller inputs a reference signal instructing a controlled variable output from an object operated in accordance with a control signal and a feedback signal, to calculate the control signal such that the feedback signal is equal to the reference signal, and to supply the calculated control signal to the object. The controller has a transfer function Gf, and functions to generate the following response waveform f (t) due to a disturbance. That is, a response waveform of the controlled variable at the time when the disturbance is added to the controlled object is set to f (t), a response waveform of the feedback signal in an opened loop state, such that feedback of said controlled variable is turned off, is set to p (t), a relative degree of the disturbance is set to "d", and a relative degree of the controlled object is set to "g". At the time in which the disturbance is added to the controlled object, each differential value of the response waveform f (t) up to at least a degree $(2g+d-2)$ is equal to each differential value corresponding to the response waveform p (t), and at finite time, each differential value of the response waveform f (t) up to at least a degree $(2g+d-2)$ becomes zero and after the finite time, the differential values relative to all degrees become zero.

8 Claims, 4 Drawing Sheets

FEEDBACK CONTROLLER

BACKGROUND OF THE INVENTION

1. Field of the Invention

The present invention relates to a feedback controller controlling an output of a controlled object in accordance with a reference value.

2. Description of the Related Art

In conventional, there has been used a feedback controller controlling an output of a controlled object in accordance with a reference value.

Figure 9:
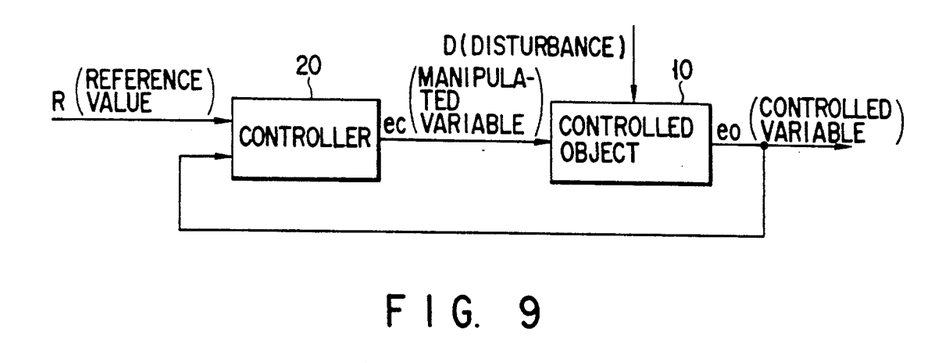
FIG. 9 is a structural diagram showing a conventional controller.

FIG. 9 shows the basic structure of the controller for performing a feedback control.

This type of controller compares an output value eo (controlled variable) of a controlled object 10 with a control reference value R for the amount of controls supplied from an external unit, and amplifies a difference between the output value eo and the reference value R by a controller 20. Then, the controlled object 10 is operated by a manipulated variable ec in accordance with the compared and amplified result such that the controlled variable eo is controlled to be equal with the control reference value R.

Such control is called as a feedback control since the controlled variable eo is fed back to the input of the controller 20.

Unexpected disturbance D is often added to the controlled object 10 from an external source. In such a case, the variation of the controlled variable due to disturbance D is fedback to the controller 20, and the manipulated variable ec is varied. As a result, the variation of the controlled variable eo due to disturbance D is suppressed.

As a method for realizing the feedback control, an analog calculation method are performed using a calculation amplifier and a digital calculation method using a microcomputer.

The analog calculation control is called as a continuous control system since signals such as the reference value and the controlled variable to be fedback are continuously controlled. On the other hand, the digital calculation control is called as a sampled-data control since signals sampled at a certain time interval are controlled.

In the sampled-data control, there is a control method, which is called "deadbeat control". According to the deadbeat control method, the controlled variable can be set in finite time even if the reference value and disturbance are varied.

In the deadbeat control of the sampled-data control, however, since the manipulated variable ec varies stepwise, a case, which is unfavorable to the controlled object, often occurs. For example, in a case where a motor control is carried out, there is a case in which large shock is given to a machine, which is used as a load and is connected to a motor. In recent years, there has been proposed a robust control method in which a sampling cycle is shortened and the controlled variable is set at relatively many numbers of sampling to be strong against the parameter variation of the controlled object. The robust control is difficult to be realized since the controller is complicated and the number of gains, which is necessary for controlling the controller, is increased.

Published Unexamined Japanese Patent Application (PUJPA) No. 3-100801 discloses a controller for performing the similar deadbeat control in the continuous control system. In the deadbeat control of the continuous control system, there is an advantage in which the degree of deterioration is smaller than with the deadbeat control of the sampled-data control system. In the description of PUJPA No. 3-100801, if a delay element of delay time, which is the same as the time to be set is used in the controller, a response to an reference value in the continuous control system and a response to disturbance can be set in finite time.

Even if it is understood that deadbeat control will be realized in the continuous control system if the delay element of delay time, which is the same as the time to be set is used in the controller, it is difficult to obtain the structure of the controller, which can realize the deadbeat control in the continuous control system. Therefore, in the present circumstances, the specific structure of the controller is obtained by a trial-and-error method.

Due to this, it is extremely difficult to apply the controller described in PUJPA No. 3-100801 to the complicatedly structured controlled object.

SUMMARY OF THE INVENTION

An object of the present invention is to provide a feedback controller, which can be easily applied to a controlled object which is widely used and includes a complicatedly structured object, and which can realize deatbeat control in a continuous control in which a response to a reference value and a response to disturbance can be set in finite time.

The feedback controller of the present invention comprises a controller, which receives a controlled variable output from a controlled object operated in accordance with a manipulated variable and an reference value instructing a value of the controlled variable, calculates a manipulated variable so as to equalize the controlled variable with the reference value, and supplies the calculated manipulated variable to the controlled object.

The above controller has transfer functions $Gf(s)$ and works to generate the following response waveform $f(t)$ to the disturbance.

More specifically, it is assumed that a response waveform of the controlled variable at the time of adding a disturbance to the controlled object is $f(t)$, a response waveform of the controlled variable in an opened loop state in which the feedback of the controlled variable is turned off is $p(t)$, a relative degree of the disturbance is d, and a relative degree of the controlled object is g.

At the time ($t=0$) when a disturbance is added to the controlled object, each of differential values of the response waveforms $f(t)$ up to at least a degree ($2g+d-2$) is equal to each differential value corresponding to the response waveform $p(t)$.

Moreover, at the finite time ($t=Tc$), there is generated the response waveform $f(t)$ in which all differential values of the response waveform $f(t)$ up to at least the ($2g+d-2$) become 0 and after the finite time ($t>Tc$), the differential values relative to all degrees becomes zero.

According to the present invention, a condition for the transfer function of the controller which can set the response to the reference value and the response to the disturbance in finite time is clarified, the controller can be easily designed in even the complicated object.

If the response to the disturbance is set in finite by controller $Gf(s)$ comprising one delay element (delay time Tc) and a proper transfer function, the following conditions must be physically satisfied in the response waveform.

The waveform of the disturbances D (s) of the relative degree d has a differential value of 0 up to degree of (d−2) at time t=0. If the disturbance is added to the object Gp (s) of relative degree g, the differential values of the controlled variable up to the degree of (g+d−2) become 0 at time 0. The controlled variable is fedback and the manipulated variable is generated by the transfer function of the relative degree 0 in the controller Gf (s). Due to this, the differential values of the manipulated variables up to the degree of (g+d−2) also become 0 at time 0. The manipulated variable is added to the controlled object of the relative degree g, thereby the controlled variable is determined.

Therefore, since the differential values of the controlled variable up to the degree of (2g+d−2) are not influenced by the controller, these differential values must be conformed to each differential value of the opened loop response.

No output is generated from the delay element up to time Tc, and the controlled variable has a waveform, which can be continuously and infinitely differentiated. At time Tc, a signal, which is generated by the delay element and the transfer function of the relative degree 0 from the controlled variable at time 0, is delayed and added to the manipulated variable.

The differential values of the manipulated variable up to the degree of (g+d−2) are 0, and this does not have influence on the differential values of the controlled variable up to the degree of (2g+d−2) at time Tc. Therefore, the differential values of the controlled variable up to the degree of (2g+d−2) are continuous at time Tc. Setting the controlled variable to 0 means that all differential values become 0. In order to satisfy continuity, the controlled variable at time Tc and all differential values up to the degree of (2g+d−2) must be 0.

The following explains a principle in which a response to a reference value and a response to disturbance can be set in finite time if the above-mentioned physical conditions are satisfied in each of the case of the response to the disturbance and the case of the response to the reference value.

Response to the Disturbance

In order to realize the deatbeat control of the continuous against the disturbance, there may be designed a controller expressed by a proper transfer functions Gf (s) wherein a controlled variable eo is set in t≧Tc when disturbances expressed by a Laplace transform D (s) are added to an object expressed by transfer functions Gp (s). The proper transfer function is a transfer function wherein a degree of s (s: variable of the Laplace transform) of a denomination is equal or larger to than that of a numerator. The controller expressed by such a transfer function does not need differential elements and can be actually structured. The point that the controller is expressed by the proper transfer function is a condition in which deadbeat control of the continuous system can be realized. It is obtained how the condition is satisfied.

Figure 7:
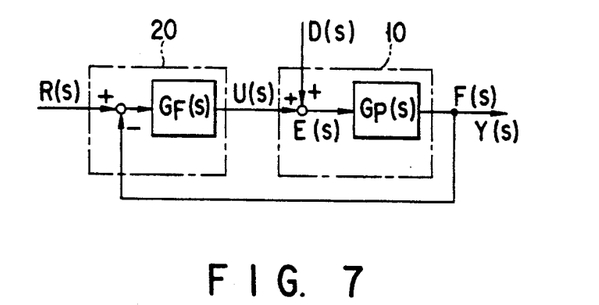
FIG. 7 is a view showing a feedback type controller by a function block.

The following equation (1) can be obtained from a block diagram of a control system of FIG. 7

$$F(s) = \frac{Gp(s)D(s)}{1 + Gf(s)Gp(s)} \quad (1)$$

wherein a response of a controlled variable eo when disturbances D (s) are added is F (s).

In consideration of deadbeat control, a waveform eo (t) of the controlled variable at this time can be expressed by the following equations (2) and (3) using a waveform f (t)

$$eo(t) = f(t) \quad 0 \leq t \leq Tc \quad (2)$$
$$eo(it) = 0 \quad t \leq Tc \quad (3)$$

Therefore, the response F(s) of the controlled variable can be expressed by the following equation (4) wherein the response waveform eo (t) is Laplace-transformed. The equation (4) is called as a finite Laplace transform since an integral interval of the normal Laplace transform is endless but that of the infinite Laplace transform is finite Tc.

$$F(s) = \int_0^{Tc} \epsilon^{-st} f(t) dt \quad (4)$$

$$F(s) = \left[ \frac{\epsilon^{-st}}{-s} f(t) \right]\int_0^{Tc} - \int_0^{Tc} \frac{\epsilon^{-st}}{-s} \overset{(i)}{f(t)} dt \quad (5)$$

wherein $$\overset{(i)}{f(t)}$$

shows differential of i degree for f(t).

If k times of integrations of parts in total are sequentially applied to an integral term appearing in a right side, F (s) can be expressed by the following equation (6).

$$F(s) = s^{-1}(f(0) - f(Tc)\epsilon^{-sTc}) \quad (6)$$
$$+ s^{-2} (\overset{(1)}{f(0)} - \overset{(1)}{f(Tc)}\epsilon^{-sTc})$$
$$\vdots$$
$$+ s^{-k} (\overset{(k-1)}{f(0)} - \overset{(k-1)}{f(Tc)}\epsilon^{-sTc})$$
$$+ s^{-k} \int_0^{Tc} \epsilon^{-st} \overset{(k)}{f(t)} dt$$

Here, if the Laplace-transform is expressed by L, F (s) can be divided into a term including $\epsilon^{-sTc}$ and a term including no $\epsilon^{-sTc}$ as shown by the following equation (7).

$$F(s) = F_0(s) + F_T(s)\epsilon^{-sTc} \quad (7)$$

wherein
$F_0(s) = Lf(t)$ and $F_T(s) = -Lf(t+Tc)$.

If transfer function Gf (s) of the controller is obtained from the equation (1), and the relation of the equation (7) is used, the following equation (8) can be obtained.

$$Gf(s) = \frac{Gp(s)D(s) - F(s)}{F(s)Gp(s)} \quad (8)$$
$$= \frac{(Gp(s)D(s) - F_0(s)) - F_T(s)\epsilon^{-sTc}}{F_0(s)Gp(s) + F_T(s)Gp(s)\epsilon^{-sTc}}$$

Moreover, if the numerator and the denominator are divided by $F_0(s)$ and $G_p(s)$, the following equation (9) can be obtained.

$$G_f(s) = \frac{\frac{G_p(s)D(s) - F_0(s)}{F_0(s)G_p(s)} - \frac{F_T(s) \cdot \epsilon^{-sT_c}}{F_0(s)G_p(s)}}{1 + \frac{F_T(s)}{F_0(s)} \epsilon^{-sT_c}} \quad (9)$$

In the equation (9), 1/denominator can be structured in a feedback form in which a second term of the denominator is a backing transfer function. In order to realize the controller by the delay element and the proper transfer function, the functions each of which is multiplied by a factor $\epsilon^{-sT_c}$ and the function of the first term of the numerator, which are described in quation (9), may be proper.

In other words, if a relative degree (the degree of the denominator—the degree of the numerator) of a meromorphic function A (s) is expressed by degs A (s), the condition in that the transfer function Gf (s) is proper can be expressed by the following equations (10), (11), and (12).

$$\text{degs } \frac{F_T(s)}{F_0(s)} = \text{degs } F_T(s) - \text{degs } F_0(s) \geq 0 \quad (10)$$

$$\text{degs } \frac{F_T(s)}{F_0(s)G_p(s)} = \text{degs } F_T(s) - \text{degs } F_0(s) - \text{degs } G_p(s) \geq 0 \quad (11)$$

$$\text{degs } \frac{G_p(s)D(s) - F_0(s)}{F_0(s)G_p(s)} = \text{degs } (G_p(s)D(s) - F_0(s)) - \text{degs } F_0(s) - \text{degs } G_p(s) \geq 0 \quad (12)$$

The function Gp (s) is set to be exactly proper (degs Gp (s)>0) so as to adjust to the actual object. Due to this, if the equation (11) is established, the equation (12) can be established, and the condition for the equation (11) can be excluded.

Excepting a special case, the relative degree of the function, which is expressed by the sum or difference, is used as a smaller relative degree of each function, and can be shown by the following inequality:

degs $(G_p (s) D (s) - F_0(s)) \leq$ degs $F_0 (s)$.

Due to this, the equation (12) becomes negative, and cannot be established. In order to establish the equation (12), the following special case can be considered.

Specifically, as shown in the equation (13), the relative degree of $F_0$ (s) and that of GP (s) D (s) are equal to each other. When $F_0$ (s) and GP (s) D (s) are reduced to a common denominator, high terms of each numerator are equal to each other, and the difference therebetween becomes 0. Then, the relative degree of Gp (s) D (s)—F0 (s) becomes (degs $F_0$ (s)+degs Gp (s)) or more.

If the relation shown in the following equation (13) is used as a condition for equations (11) and (12), the following equations (14) and (15) can be obtained.

In order to make Gf (s) proper, the conditions for the equations (13), (14) and (15) may be satisfied.

degs $F_0(s) =$ degs $P(s) = g+d$ (13)

degs $F_T(s) \geq 2g+d$ (14)

degs $(P(s) - F_0(s)) \geq 2g+d$ (15)

wherein P (s)=Gp (s) D (s), degs Gp (s)=g (g>0), and degs D (s)=d (d>0: the disturbance is set to an exactly proper function, which is meaningful from an engineering viewpoint.)

P (s) is a response to the disturbance D (s) when the feedback is turned off. That is, P (s) is an opened loop response. If the waveform of the opened loop response is P (t), P (s) can be expressed as a Laplace transform by the following equation (16), and if k times of integrations of parts are applied, P (s) can be expressed by the following equation (17).

$$P(s) = \int_0^\infty \epsilon^{-st} p(t) dt \quad (16)$$

$$P(s) = s^{-1} \overset{(1)}{p}(0) + s^{-2} \overset{(1)}{p}(0) + \ldots + \quad (17)$$

$$s^{-k} \overset{(k-1)}{p}(0) + s^{-k} \int_0^\infty \epsilon^{-st} \overset{(k)}{p}(t) dt$$

Since D (s), Gp (s) are made to be exactly proper, P (s) also exactly proper, and P (t) can be continuously and infinitely differentiated. If P (s) is expanded by sequentially applying an infinite times of integrations by parts to an integral term appearing in a right side, the following equation (18) can be obtained in consideration of the fact that the relative degree of P (s) is g+d.

$$P(s) = s^{-g-d} \overset{(g+d+1)}{p}(0) + s^{-g-d-1} \overset{(g+d)}{p}(0) + \ldots + \quad (18)$$

$$s^{-k} \overset{(k-1)}{p}(0) + s^{-k-1} \overset{(k)}{p}(0) + \ldots$$

$F_0(s)$ (=Lf (t)) satisfying equation (13) is exactly proper, and f(t) becomes a waveform which can infinitely and continuously differentiated. If F (s) is expanded by the integration by parts, the following equation (19) can be obtained.

$$F(s) = s^{-1}(f(0) - f(T_c)\epsilon^{-sT_c}) + \quad (19)$$

$$s^{-2}(\overset{(1)}{f}(0) - \overset{(1)}{f}(T_c)\epsilon^{-sT_c}) +$$

$$\cdot$$
$$\cdot$$

$$s^{-k}(\overset{(k-1)}{f}(0) - \overset{(k-1)}{f}(T_c)\epsilon^{-sT_c}) +$$

$$s^{-k-1}(\overset{(k)}{f}(0) - \overset{(k)}{f}(T_c)\epsilon^{-sT_c})$$

First, in order to satisfy equation (13), $f(0)$ to $\overset{(g+d+2)}{f}(0)$ must be 0.

Next, in order to satisfy equation (14), $f(T_c)$ to $\overset{(2g+d-2)}{f}(T_c)$ must be 0.

Moreover, in order to satisfy equation (15)

$\overset{(g+d-1)}{f}(0)$ to $\overset{(2g+d-2)}{f}(0)$ and $\overset{(g+d-1)}{p}(0)$ to $\overset{(2g+d-2)}{p}(0)$ -continued must be conformed to each other.

The conditions for these response waveforms f (t) can be summarized by the following equation (20).

$$f^{(i)}(0) = p^{(i)}(0) \quad 0 \leq i \leq 2g + d - 2 \quad (20)$$
$$f^{(i)}(Tc) = 0$$

wherein $$p^{(i)}(0) = 0 \quad 0 \leq i \leq g + d - 2$$

In other words, when a response waveform f(t) as follows is selected, the controller comprising the proper transfer function and the delay element is determined from the disturbance response F (s), which finitely Laplace-transforms the response waveform f (t) from 0 to Tc. The response waveform f(t) has the differential values up to the degree of (2g+d−2), which is determined by the relative degree d of the disturbance and the relative degree g of the object, the differential values being equal to each differential value of the opened loop response waveform p (t) in a condition that t=0, and, equal to 0 in a condition that t=Tc.

Response to the reference value

Deadbeat control against the reference value will be explained with reference to FIG. 7.

Response F (s) of the controlled variable eo and controller Gf(s) in a case where only disturbance D (s) is added can be expressed by the following equations (21) and (22).

$$F(s) = \frac{Gp(s)D(s)}{1 + Gf(s)Gp(s)} \quad (21)$$

$$Gf(s) = \frac{Gp(s)D(s) - F(s)}{F(s)Gp(s)} \quad (22)$$

If a response of the controlled variable eo in a case where only reference value R (s) is added is Y (s), and the reference value R (s) and the disturbance D (s) are the same function, Y (s) can be expressed by the following equation (23).

$$Y(s) = \frac{Gf(s)Gp(s)D(s)}{1 + Gf(s)Gp(s)} = Gf(s)F(s) \quad (23)$$
$$= D(s) - \frac{F(s)}{Gp(s)} = D(s) - E(s) = -U(s)$$

wherein E (s) is an input of the object at the time of responding to the disturbance, and U (s) is a manipulated variable at the time of responding to the disturbance.

The following fact can be said from the equation (23).

If the input E (s) of the object is set to 0 at time Tc, the response Y (s) to the reference value R (s), which has the same function as the disturbance D (s), conforms to the reference value after time Tc. At this time, the response Y (s) to the reference value has the same function (waveform) as a manipulated value U at the time of responding to the disturbance.

Therefore, in order to finitely set the response to the reference value and one to the disturbance in the control system of FIG. 7, there may be designed a controller, which is expressed by the proper transfer function Gf (s) wherein the control value is set to 0 at $t \geq Tc$ and the input of the object to be controlled is set to 0 at $t \geq Tc$ when the disturbance is added.

Figure 8:
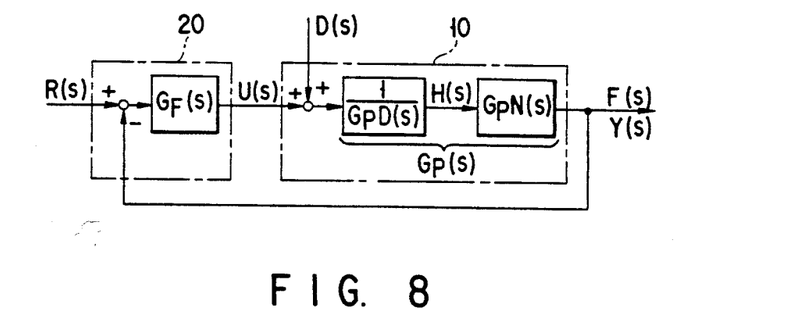
FIG. 8 is a view showing a state that a function of a controlled object to be controlled is divided into the function block of a denominator element and that of a numerator element.

In order to obtain the condition for the above controller, as shown in FIG. 8, the object Gp (s) to be controlled is divided into the denominator element $Gp_D$ (s) and the numerator element $Gp_N$(s). Then, the response H (s) of an intermediate section will be considered.

The input E (s) of the object is expressed by $Gp_D$ H (s) and the controlled variable F (s) is expressed by $Gp_N$(s) H (s). Since $Gp_D$(s) and $Gp_N$(s) are a polynomial of s, that is, operators for proportion and differential. Both the input of the object and the controlled variable become 0 after time Tc if the intermediate section becomes 0 after time Tc (see the following equation (24)).

$$Gp(s) = \frac{GpN(s)}{GpD(s)} \quad (24)$$

wherein $$GpN(s) = b_n s^n + b_{n-1}s^{n-1} + \ldots + b_0$$

$$GpD(s) = s^m + a_{m-1}s^{m-1} + a_0$$

Therefore, $\deg s\, Gp(s) = g = m - n$ wherein

The response H (s) of the intermediate section can be expressed by the following equation (25).

$$H(s) = \frac{Gp(s) \frac{D(s)}{GpN(s)}}{1 + Gf(s)Gp(s)} \quad (25)$$

It can be considered that the disturbance D (s) in the right side of F (s) of the equation (1) is replaced with D (s)/Gp N (s). Then, d is replaced with d+n and d is replaced with m−n, so that the expansion, which is the same as the expansion of the response to the disturbance, can be performed. A condition for obtaining the proper controller Gf (s) in which the response of the intermediate section is set to 0 after time Tc can be obtained by the following expression (26):

$$\left. \begin{array}{l} h^{(i)}(0) = q^{(i)}(0) \\ h^{(i)}(Tc) = 0 \end{array} \right\} 0 \leq i \leq 2m - n + d - 2 \quad (26)$$

$$q^{(i)}(0) = 0 \quad 0 \leq i \leq m + d - 2$$

wherein h (t) is response of the intermediate section ($0 \leq t \leq TC$), q (t) is the open loop response of the intermediate section, m is the degree of the denominator of the object Gp (s), n is the degree of the numerator of the object Gp (s) to be controlled, and d is the relative degree of the disturbance D (s).

As mentioned above, there can be realized the control of the continuous system in which the disturbance and the instruction both having the same function can be finitely set. With respect to the reference value of arbitrary time, and the combination of the disturbance variable, the response becomes the superposition of individual responses. In a case where the numerator element of the object is a constant, that is, the degree of the numerator is 0, the response to the reference value can be finitely set if the condition for the deadbeat control of the continuous system against the disturbance is satisfied. Moreover, in a case where the disturbance and the reference value are a proportional differential function of the function assumed at the time of design, their responses are also the proportional differential function having a response waveform selected at the time of design, so that the deatbeat control of the continuous system can be established. For example, the control operation section, which is designed on the assumption that the disturbance and the reference value are $1/s^2$ (time function t), can finitely set to the 1/s (step function) and 1 (impulse function).

The reference value and the disturbance, which are assumed by the general controller, are normally set to the step function. In such a case, a controller in which the response to the disturbance is set to 0 at finite time is obtained. Then, the response to the disturbance is finitely set to 0 at time Tc such that the transfer function from the reference value to the manipulated variable becomes an integral (C/s: C is a constant). Thereby, the response to the reference value is finitely set without changing after time Tc.

As explained above, the response waveform satisfying the control for the differential value up to the degree, which is determined by the relative degree of the disturbance and the relative degree of the object, is selected. Thereby, the transfer function of the controller can be obtained and the controller, which can finitely set the reference value and the disturbance, can be obtained.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A first embodiment of the present invention will be explained.

Figure 1:
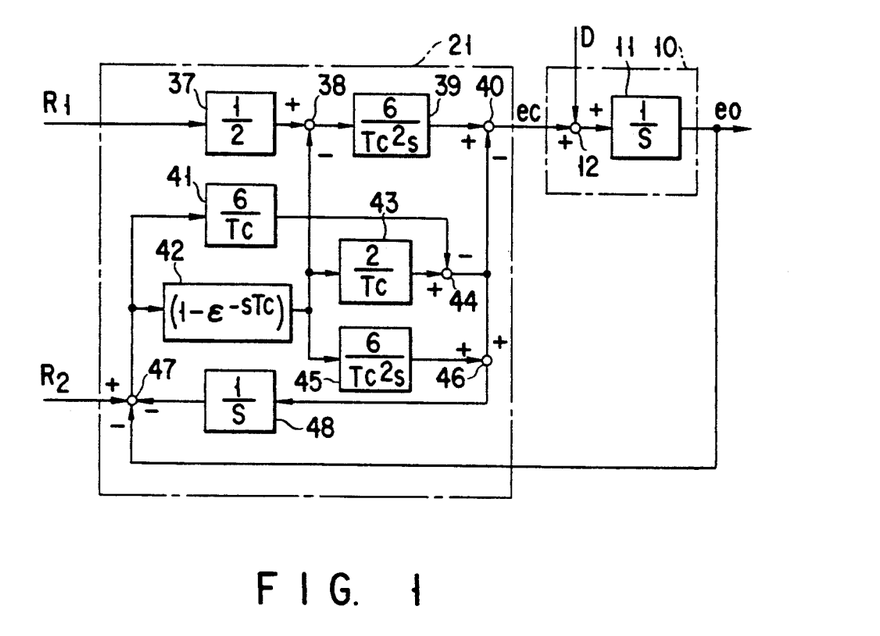
FIG. 1 is a structural diagram showing a controller relating to a first embodiment of the present invention.

FIG. 1 shows the structure of a feedback controller relating to the first embodiment.

The first embodiment shows a general case in which the reference value and the disturbance value are set to be a step function (1/s). Moreover, an integrator 11 shown by the step function (1/s) is used in a controlled object 10.

The controller 20 in this embodiment of the present invention comprises first to third linear amplifiers 37, 41, and 43, first to third integrating amplifiers 39, 48, and 45, first to fifth adder-subtracters 38, 40, 44, 47, and 46, and a delay element 42.

In this embodiment, the gain of the first linear amplifier 37 is set to ½. The first linear amplifier 37 receives a reference value $R_1$ from an external and outputs the linear amplification value to the first adder-subtracter 38.

The first adder-subtracter 38 further receives an output value from the delay element 42, and subtracts the output value of the delay element 42 from the output value of the first linear amplifier 37.

In the first integrator 39, the transfer function of $6/(Tc^2 \cdot S)$ is set, and the output value of the first adder-subtracter 38 is input and integrated, and the integral value is output to the second adder-subtracter 40.

The second adder-subtracter 40 receives an output value from the third adder-subtracter 44, and subtracts the output of the third adder-subtracter 44 from the output value of the first integrator 39, and outputs the subtracted value to the controlled object as a manipulated variable.

A step reference value $R_2$ is supplied to the fourth adder-subtracter 47 from an external source, and a controlled variable eo is supplied thereto from the controlled object 10. The fourth adder-subtracter 47 further receives an output of the second integrator 48, subtracts the controlled variable eo and the output value of the second integrator 48 from the step reference value $R_2$, and outputs the subtracted value to the delay element 42 and the second linear amplifier 41.

The second integrator 48 receives an output value of the fifth adder-subtracter 46, integrates the output value by the step function 1/s, and outputs the integrated value to the fourth adder-subtracter 47.

The delay element 42 delays the output value, which is supplied from the fourth adding-subtracting means, by $(1-\epsilon^{-sTc})$, and outputs the delayed value to the adder-subtracter 38, the third linear amplifier 41, and the third integrator 45.

The second linear amplifier 41 linearly amplifies the output value of the fourth adder-subtracter 47 by gain of 6/c, and outputs the amplified value to the third adder-subtracter 44. The third integrator has a transfer function $6/(Tc^2 \cdot s)$, integrates the output value of the delay element 42, and outputs the integrated value to the fifth adder-subtracter 46.

The third linear amplifier 43 linearly amplifies the output value of the delay element 42 by gain of 2/Tc, and outputs the amplified value to the third adder-subtracter 44. Moreover, the fifth adder 46 adds the output value of the third integrator 45 and that of the third adder-subtracter 44, and outputs the added value to the second integrator 48.

As mentioned above, the above structural elements are combined as follows.

The controlled object Gp (s) to be controlled, and the disturbance D (s) are set to 1/s, the following equations are established:

$$\left.\begin{array}{l}\text{degs } Gp(s) = g = 1 \\ \text{degs } D(s) = d = 1\end{array}\right\} 2g + d - 2 = 1$$

The condition for the disturbance response waveform f (t) corresponding to the equation (20) can be expressed by the following four equations.

$$f(0) = p(0) = 0 \quad (27)$$

$$f^{(1)}(0) = p^{(1)}(0) = 1 \quad (28)$$

$$f(Tc) = 0 \quad (29)$$

$$f^{(1)}(Tc) = 0 \quad (30)$$

Then, select a target response waveform f (t) by the following third-degree expression (31).

$$f(t) = a_0 + a_1 t + a_2 t^2 + a_3 t^3 \quad (31)$$

A process for obtaining the control operation section 20 will be explained.

The relationship among equations (27) to (30) against the response waveform f (t) can be obtained by the following equations (32) to (35).

$$f(0) = a_0 = 0 \quad (32)$$

$$f^{(1)}(0) = a_1 = 1 \quad (33)$$

$$f(Tc) = Tc + a_2 Tc^2 + a_3 Tc^3 = 0 \quad (34)$$

$$f^{(1)}(Tc) = 1 + 2a_2 Tc + 3a_3 Tc^2 = 0 \quad (35)$$

Therefore, the response waveform f (t) can be expressed by the following equation (36)

$$f(t) = t - \frac{2t^2}{TC} + \frac{t^3}{Tc^2} \quad (36)$$

Then, obtain a Laplace transform F (s) of Tc from time 0 of f (t) by the following equation (37).

$$F(s) = \frac{1}{s^2}\left(\frac{6}{Tc^2 s^2} - \frac{4}{Tcs} + 1 - \left(\frac{6}{Tc^2 s^2} + \frac{2}{Tcs}\right)\epsilon^{-sTc}\right) \quad (37)$$

In Gf (s) of the equation (22), if 1/s is placed for Gp (s), D (s), and F (s) of the equation (37) is substituted for F (s) of the equation (22), the following equation (38) can be obtained.

$$Gf(s) = \frac{1/s^2 - F(s)}{F(s)/s} \quad (38)$$

$$= \frac{-\left\{-\frac{6}{Tc} + (1 - \epsilon^{-sTc})\left(\frac{2}{Tc} + \frac{6}{Tc^2 s}\right)\right\}}{1 + \left\{-\frac{6}{Tc} + (1 - \epsilon^{-sTc})\left(\frac{2}{Tc} + \frac{6}{Tc^2 s}\right)\right\}\frac{1}{s}}$$

The structure of the control system using the controller obtained by the equation (38) can be shown by the block diagram of FIG. 1.

Since the numerator element of the controlled object is a constant, the step reference value R2 is finitely set.

Moreover, since the reference value is the step function, there can be finitely set the reference value to be input to the first adder-subtracter 38 in which the transfer function, which is from the reference value to the manipulated variable, is an integral.

The gain of the first linear amplifier 37 is selected such that the relation of the manipulated variable eo to the reference value $R_1$ becomes 1.

Figure 2:
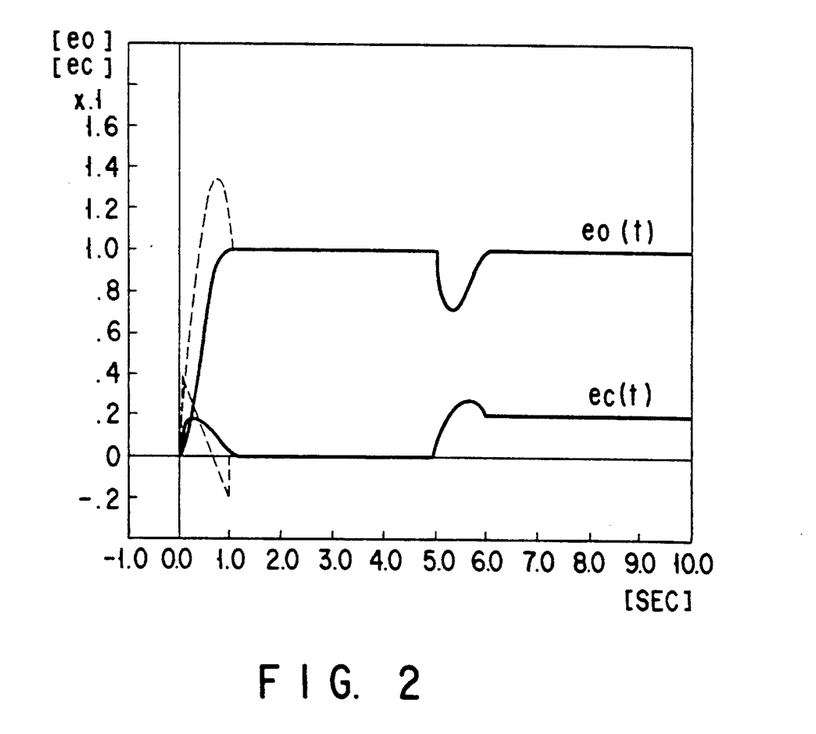
FIG. 2 is a view showing a response waveform of the first embodiment.

FIG. 2 shows the response waveform in a case where a setting time Tc is one second.

Moreover, in the drawing, the controlled variable eo (t) and the response to the manipulated variable ec (t) are shown in a case where the reference value is varied from 0 to 1 at t=0 and the disturbance is varied from 0 to −2 at t=5 seconds. A solid line shows a case in which the reference value is input to $R_1$, and a chain line shows the case in which the reference value is input to $R_2$. There is no difference therebetween in the response to the disturbance.

A second embodiment of the present invention will be explained.

Figure 3:
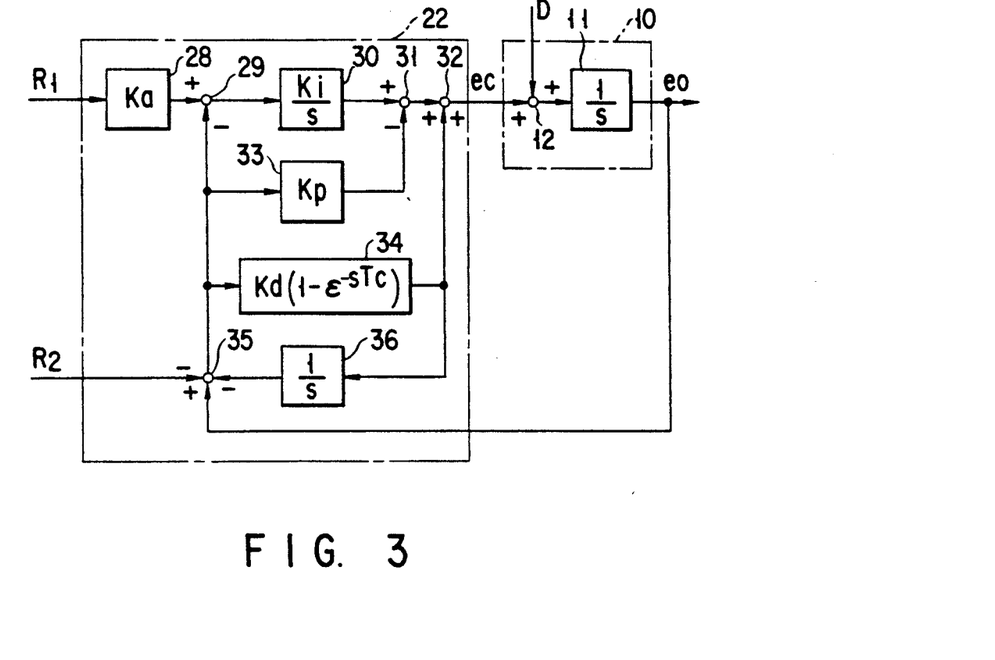
FIG. 3 is a structural diagram showing a controller relating to a second embodiment of the present invention.

FIG. 3 is a structural diagram showing a controller relating to the second embodiment of the present invention. Similar to the first embodiment, this embodiment shows a case in which the reference value and the disturbance are set to be a step function (1/s), and the controlled object 10 to be controlled is shown in the integrator 11.

A controller 22 comprises first to fourth adder-subtracters 29, 35, 31, 32, first and second integrating amplifiers 30 and 36, first and second linear amplifiers 28 and 33, and a delay element 34.

A reference value is input to the first linear amplifier 28 whose gain is set to Ka. The first adder-subtracter 29 receives an output value of the first linear amplifier 28, further receives an output value of the second adder-subtracter 35, and subtracts the output of the second adder-subtracter 35 from the output value of the first linear amplifier 28.

The first integrator 30 has a transfer function Ki/S, integrates the output value of the first adder-subtracter 29, and outputs the integrated value to the third adder-subtracter 31. The third adder-subtracter 31 subtracts the output value of the second linear amplifier 33 from the output value of the first integrator 30.

The fourth adder-subtracter 32 adds an output value of the delay element 34 and the output value of the third adder-subtracter 31, and supplies the added value to the controlled object 10 as the manipulated variable.

The second adder-subtracter 35 subtracts an output value of the second integrator 36 and a step reference value R2 supplied from an external from the control value eo output from the controlled object 10. The output value of the second adder-subtracter 35 is supplied to the first adder-subtracter 29, the delay element 34, and the second linear amplifier 33, respectively.

The delay element 34 delays the output value of the second adder-subtracter 35 by Kd $(1-\epsilon^{-sTc})$ and outputs the delayed value. The second integrator 36 integrates the output value of the delay element 34 by the transfer function 1/s, and outputs the integrated value to the second adder-subtracter 35. The second linear amplifier 33 linearly amplifies the output value of the second adder-subtracter 35 by gain of Kp, and outputs the amplified value to the third adder-subtracter 31.

A process for obtaining the above-structured controller 22 will be explained.

In this embodiment, an attenuation sine wave, which is an exponential function, is selected as a target response waveform f (t). The attenuation sine wave includes four parameters, that is, an amplitude b, an attenuation factor $\beta$, an angular frequency $\omega_1$, and a phase $\phi_1$. These parameters seem to be determined by the equations (27) to (30).

The attenuation sine wave, however, slantingly crosses 0, and this can not satisfy both equations (29) and (30). Due to this, a constant value "a" constant value a is added, and f (t) is selected by the following equation (39).

$$f(t) = a + b\epsilon^{-\beta t} \sin(\omega_1 t + \phi_1) \quad (39)$$

Then, the relationship among equations (27) to (30) against the response waveform f (t) can be obtained by the following equations (40) to (43).

$$f(0) = a + b\sin\phi_1 = 0 \quad (40)$$

$$(1) \quad (41)$$
$$f(0) = -b\beta\sin\phi_1 + b\omega_1\cos\phi_1 = 1$$

$$f(Tc) = a + b\epsilon^{-\beta Tc}\sin(\omega_1 Tc + \phi_1) = 0 \quad (42)$$

$$(1) \quad (43)$$
$$f(Tc) = -b\beta\epsilon^{-\beta Tc}\sin(\omega_1 Tc + \phi_1) + b\omega_1\epsilon^{-\beta Tc}\cos(\omega_1 Tc + \phi_1) = 0$$

Then, obtain a Laplace transform F (s) of Tc from time 0 of f (t) by the following equations (44) and (45).

$$F(s) = \left[ \frac{a}{-s}\epsilon^{-st} + b\epsilon^{-(\beta+s)t} \times \right. \quad (44)$$

$$\left. \frac{-(s+\beta)\sin(\omega_1 t + \phi_1) - \omega_1\cos(\omega_1 t + \phi_1)}{(s+\beta)^2 + \omega_1^2} \right]_0^{Tc}$$

$$F(s) = \frac{s + a(\beta^2 + \omega_1^2)(1 - \epsilon^{-sTc})}{s\{(s+\beta)^2 + \omega_1^2\}} \quad (45)$$

In Gf (s) of the equation (22), if 1/s is substituted for Gp (s), D (s) and F (s) of the equation (45) is substituted for F (s) of the equation (22), the following equation (46) can be obtained.

$$Gf(s) = \frac{2\beta + \frac{\beta^2 + \omega_1^2}{s} - a(\beta^2 + \omega_1^2)(1 - \epsilon^{-sTc})}{1 + a(\beta^2 + \omega_1^2)\frac{(1 - \epsilon^{-sTc})}{s}} \quad (46)$$

The structure of the control system using the controller obtained by the equation (46) can be shown by the block diagram of FIG. 3. In this case, however, Kp is $2\beta$, Ki is $\beta^2+\omega_1^2$, Kd is $a(\beta^2+\omega_1^2)$, a is a constant value, and Ka is $(1+Kd\cdot Tc)^{-1}$.

Figure 4:
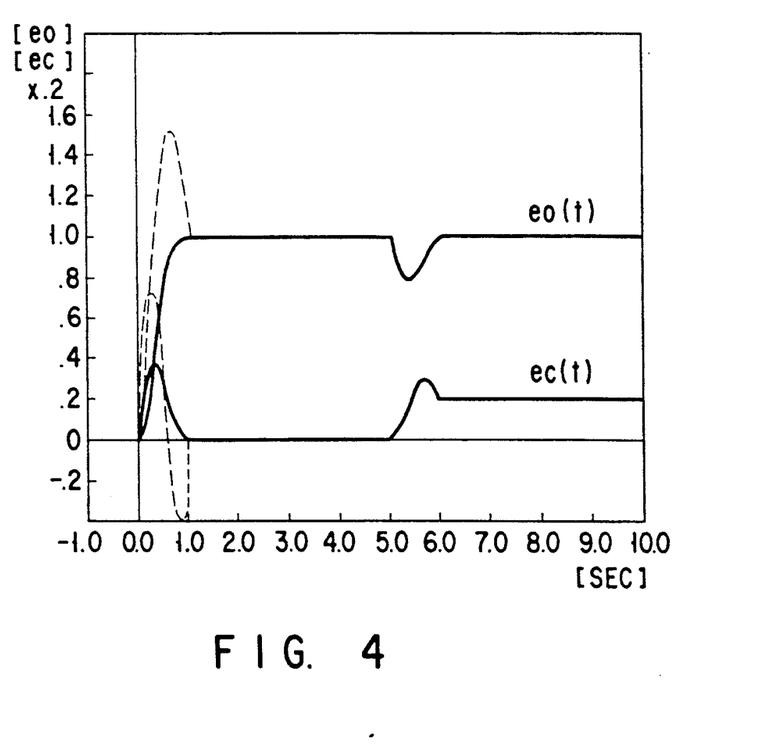
FIG. 4 is a view showing a response waveform of the second embodiment.

In this embodiment, if a setting time Tc is given and one of values of three parameters, that is, a, $\beta$, $\omega_1$ is suitably determined, the residual two values of the parameters are determined from two equations, which can be obtained by eliminating b and $\phi_1$ from the equations (40) to (43). For example, if Tc is one second and $\beta$ is 1, a=0.07337703141 and $\omega_1$=4.878908146. FIG. 4 shows the response waveforms based on these numerical examples. More specifically, FIG. 4 shows the response waveforms of the controlled variable eo (t) and the manipulated value ec (t) in a case where the reference value changes from 0 to 1 at time=0 second and the disturbance changes from 0 to −1 at time=5 seconds. The response to the reference value $R_1$ is shown by a solid line and the response to the reference value $R_2$ is shown by a broken line.

A third embodiment of the present invention will be explained.

Figure 5:
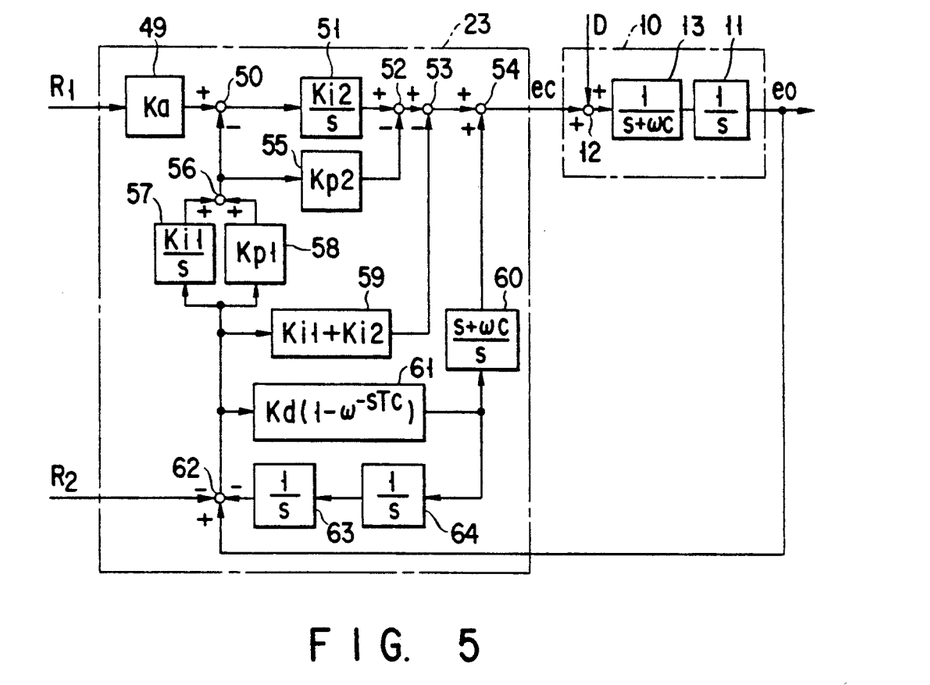
FIG. 5 is a structural diagram showing a controller relating to a third embodiment of the present invention.

FIG. 5 shows the structure of the controller relating to the third embodiment.

In this embodiment, the controlled object 10 is shown by the integrator 11 and a time-lag of first order 13, and the the transfer function Gp (s) of the controlled object is $1/\{(s+\omega c)\}$.

A controller 23 of the controller of the third embodiment comprises first to sixth adder-subtracters 50, 56, 52, 53, 54, and 62, first to fifth integrators 51, 60, 63, 57, and 64, first to fourth linear amplifiers 49, 55, 58, and 59, and a delay element 61.

In this embodiment, a reference value is input to the first linear amplifier 49 whose gain is set to Ka. The first adder-subtracter 50 receives an output value of the first linear amplifier 49, further receives an output value of the second adder-subtracter 56, and subtracts the output of the second adder-subtracter 56 from the output value of the first linear amplifier 49.

The first integrator 51 has a transfer function $Ki_2/S$, integrates the output value of the first adder-subtracter 50 by a transfer function $Ki_2/S$, and outputs the integrated value to the third adder-subtracter 52. The third adder-subtracter 52 subtracts the output value of the second linear amplifier 55 from the output value of the first integrator 51. The subtracted value is supplied to the fourth adder-subtracter 53. The fourth adder-subtracter 53 subtracts the output value of the third adder-subtracter 52 from an output value of the delay element 59 and further outputs the subtracted value to the fifth adder-subtracter 54.

The fifth adder-subtracter 54 receives an output value from the second integrator 60 and adds the output value of the fourth adder-subtracter 53 and the output value of the second integrator 60, and supplies the added value to the controlled object 10 as a manipulated variable.

Moreover, in this embodiment, the reference value $R_2$ and the controlled variable eo output from the controlled object 10 are supplied to the sixth adder-subtracter 62. The sixth adder-subtracter 62 subtracts the output value of the third integrator 63 and the reference value R$_2$ from the controlled variable output from the controlled object 10. The subtracted value of the the sixth adder-subtracter 62 is supplied to the fourth integrator 57, third linear amplifier 58, fourth linear amplifier 59, and the delay element 61.

The fourth integrator 57 integrates the output value of the sixth adder-subtracter 62 by the transfer function Ki$_1$/S, and outputs the integrated value to the second adder-subtracter 56. Also, the third linear amplifier 58 linearly amplifies the output value of the sixth adder-subtracter 62 with gain of Kp$_1$, and outputs the value to the second adder-subtracter 56.

The fourth linear amplifier 59 whose gain is set to (Ki$_1$+Ki$_2$) linearly amplifies the output value of the sixth adder-subtracter 62.

The delay element 61 delays the output value of the sixth adder-subtracter 62 by Kd $(1-\omega^{-sTc})$ and outputs the delayed value.

The second adder-subtracter 56 adds the output value of the fourth integrator 57 and that of the third linear amplifier 58 and outputs the added value to the first adder-subtracter 50 and the second linear amplifier 55. The second linear amplifier 55 linear amplifies the output value of the second adder-subtracter 56 with gain of KP$_2$ and supplies the value to the third adder-subtracter 52.

The second integrator 60 linearly integrates the output value of the delay element 61 by the transfer function $(s+\omega c)/s$. Moreover, the fifth integrator 64 integrates the output value of the delay element 61 by the transfer function 1/S.

A process for obtaining the above-structured controller 23 will be explained.

In this case, the disturbance D (s) is the step function, the relative degree of the controlled object Gp (s) is 2, the disturbance D (s) is 1/s and the relative degree is 1. Therefore, the following equations can be established:

degs $Gp(s) = g = 2$ degs $D(s) = d = 1$

Therefore, $2g + d - 2 = 3$

Based on the above equations, the relationship among equations (27) to (30) against the response waveform f (t) can be obtained by the following equations (47) to (51).

$$f(0) = p(0) = 0 \quad (47)$$

$$\overset{(1)}{f}(0) = \overset{(1)}{p}(0) = 0 \quad (48)$$

$$\overset{(2)}{f}(0) = \overset{(2)}{p}(0) = 1 \quad (49)$$

$$\overset{(3)}{f}(0) = \overset{(3)}{p}(0) = -\omega c \quad (50)$$

$$\overset{(i)}{f}(Tc) = 0 \quad 0 \leq i = 3 \quad (51)$$

A polynomial can be relatively easily obtained as a waveform f (t) to be a target. Due to this, this embodiment shows a case of an attenuation sine wave. Since eight conditional expressions can be satisfied, the following equation (52) in which a constant value a is added to two attenuation sine waves is selected.

$$f(t) = a + be^{-\beta t}\sin(\omega_1 t + \phi_1) + ce^{-\gamma t}\sin(\omega_2 t + \phi_2) \quad (52)$$

If F (s) in which f (t) is Laplace-transformed at time between 0 and Tc is obtained and rearranged by the function, which is obtained from the conditional expressions (47) to (51), F (s) can be expressed by the following equation (53).

$$F(s) = \frac{\left\{\begin{array}{l} s^2 + 2(\beta + \gamma)s - \omega cs + \\ a(\beta^2 + \omega_1^2)(\gamma^2 + \omega_2^2)(1 - \epsilon^{-sTc}) \end{array}\right\}}{s\{(s+\beta)^2 + \omega_1^2\}\{(s+\gamma)^2 + \omega_2^2\}} \quad (53)$$

In Gf (s) of the equation (22), if $1/\{S+\omega c)s\}$ is placed for Gp (s) and 1/s is placed for D (s), and F (s) of the equation (53) is substituted for F (s) of the equation (22), the following equation (54) can be obtained $$Gf(s) = \frac{\left\{\begin{array}{l}(\beta^2 + \omega_1^2 + \gamma^2 + \omega_2^2) + \left(2\beta + \frac{\beta^2 + \omega_1^2}{s}\right)\left(2\gamma + \frac{\gamma^2 + \omega_2^2}{s}\right) - \\ \{2(\beta + \gamma) - \omega c\}\omega c - a(\beta^2 + \omega_1^2)(\gamma^2 + \omega_2^2)\frac{s + \omega c}{s}(1 - \epsilon^{-sTc})\end{array}\right\}}{\left\{1 + \frac{2(\beta + \gamma) - \omega c}{2} + a(\beta^2 + \omega_1^2)(\gamma^2 + \omega_1^2)\frac{(1 - \epsilon^{-sTc})}{s^2}\right\}} \quad (54)$$

In order to simplify the structure of the control operation section, if the condition of the following equation (55) is added, the structure shown in FIG. 5 can be obtained.

$$2(\beta+\gamma) - \omega c = 0 \quad (55)$$

wherein Kp$_1$, Kp$_2$, Ki$_1$, Ki$_2$, Kd, and Ka are replaced with $2\beta$, $2\gamma$, $\beta^2+\omega_1^2$, $\gamma^2+\omega_2^2$, $a(\beta^2+\omega_1^2)(\gamma^2+\omega_2^2)$, and $[a(\gamma^2+\omega_2^2)Tc]$, respectively.

Similar to the first and and second embodiments, two reference value inputs R$_1$ and R$_2$ can be finitely set. If the setting time Tc and the time-lag of first order $\omega c$ are given, a, $\beta$, $\omega_1$, $\gamma$, $\omega_2$ are determined from the four equations, which can be obtained by eliminating b, c, $\phi$1, $\phi$2, from the relation among the equations (47) to (55), and the equation (55). The examples of the numerical values are shown as follows.

In a condition that Tc=2. 5119224742, $\omega c$=3. 177556,
a=0. 069941131833
$\beta$=0. 2

$\omega_1 = 1.0$
$\gamma = 1.388777999$
$\omega_2 = 3.4378948638$

Figure 6:
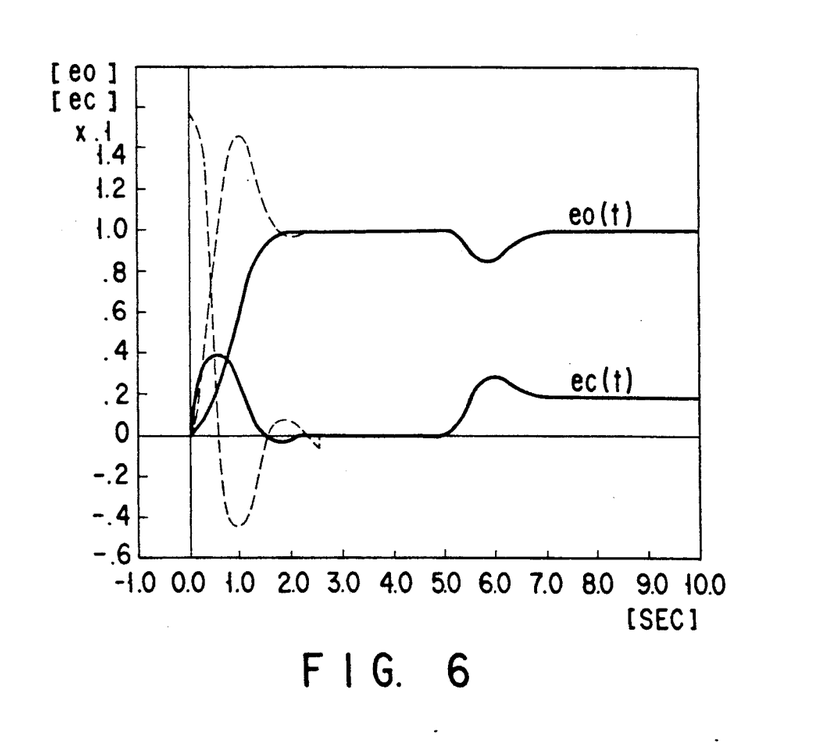
FIG. 6 is a view showing a response waveform of the third embodiment.

FIG. 6 shows the response waveforms based on these numerical examples. More specifically, FIG. 6 shows the response waveforms of the controlled variable eo (t) and the manipulated variable ec (t) in a case where the reference value changes from 0 to 1 at time=0 second and the disturbance changes from 0 to −2 at time=5 seconds. The response to the reference value $R_1(s)$ is shown by a solid line and the response to the reference value $R_2(s)$ is shown by a broken line.

The above explained the embodiments of the controller, which can finitely set in the continuous system, according to the present invention. The above explained the relatively easy controlled object to be controlled and the disturbance function in order to simplify the explanation. In the case of the complicated controlled object to be controlled and the disturbance function, the structure of the controller can be also obtained. This is much easier than the conventional case in which the structure of the control operation section must be determined by a trial and error method. Moreover, even if a digital calculation is performed by a microcomputer, these control operation sections can obtain the similar response. Therefore, the deadbeat control of the sample-data system, which is better than the conventional deadbeat control of the sample-data system, can be obtained.

As mentioned above, the deadbeat control, which is realized by the controller of the present invention, can set the responses to the reference value and the disturbance at finite time. Moreover, the deadbeat control has a feature of the continuous control, which is smooth and strong against the change of the parameters of the control system and a feature of the control, which can set the responses at finite time. Therefore, the deadbeat control having such good features can be performed and can be applied to the controlled object to be controlled in the various technical fields, and can bring about a considerable effect.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A feedback control system comprising:
   a controlled object having a relative degree g; and
   a controller, including:
   a first input for receiving a reference signal;
   a second input for receiving a feedback signal from the controlled object;
   an output, connected to an input of the controlled object, for outputting a control signal;
   control means, connected to the first input, the second input, and the output, having a predetermined gain, for receiving the reference signal from the first input and the feedback signal from the second input, and for generating the control signal in accordance with said gain to equalize the feedback signal with the reference signal;
   wherein, the controlled object comprises:
   means for generating a response waveform, f(t) having a plurality of degrees, of the feedback signal of the controlled object when a disturbance is imparted on the controlled object, a relative degree of the disturbance being d;
   means for generating a response waveform, p(t), of the feedback signal of the controlled object when the controlled object and the controller are in an open loop state such that the feedback signal from the controlled object is not received by the controller;
   wherein said means for generating the response waveform f(t) generates said response waveform f(t) such that a differential of said response waveform f(t) for each of said plurality of degrees up to at least a degree (2g+d−2) is equal to a differential corresponding to the response waveform p(t) at time t=0; and
   wherein said means for generating the response waveform f(t) generates said response waveform f(t), such that a differential of said each of said degrees of said response waveform up to at least a degree (2g+d−2) is zero at a finite time t=Tc and such that a differential of each of said degrees of said response waveform f(t) is zero after said finite time, t>Tc.

2. The control system according to claim 1, wherein:
   said control means further comprises means for generating a transfer function of said control means to be Gf(s), said transfer function Gf(s) being defined by said gain of said control means;
   said controlled object further comprises:
   means for generating a transfer function having a denominator element and a numerator element which are connected in series to each other, a degree of said denominator element being m, and a degree of said numerator element being n;
   means for generating an intermediate response, h(t) having a plurality of degrees, of the controlled object at an intermediate section of said controlled object between said numerator element and said denominator element, when said disturbance is applied to said controlled object;
   means for generating a response waveform g(t) at said intermediate section in response to the disturbance when said control system is in the open loop state;
   wherein said means for generating the response waveform h(t) generates said response waveform h(t) such that a differential of said response waveform h(t) for each of said plurality of degrees up to at least a degree (2m−n+d−2) is equal to a differential corresponding to the response waveform q(t) at time t=0; and
   wherein said means for generating the response waveform h(t) generates said response waveform h(t), such that a differential of said each of said degrees of said response waveform up to at least a degree (2m−n+d−2) is zero at a finite time t=Tc and such that a differential of each of said degrees of said response waveform h(t) is zero after said finite time, t>Tc.

3. A control system according to claim 1, wherein when said controlled object and said disturbance each have a step function (1/s) whose relative degree is "1", and said response waveform f (t) is expressed by a polynomial, said control means further comprising:
   means for generating a transfer function Gf (s) of the control means, defined by said gain of the control means, to be expressed by the following equation:

$$G_f(s) = \frac{-\left\{-\frac{6}{Tc} + (1 - \epsilon^{-sTc})\left(\frac{2}{Tc} + \frac{6}{Tc^2 s}\right)\right\}}{1 + \left\{-\frac{6}{Tc} + (1 - \epsilon^{-sTc})\left(\frac{2}{Tc} + \frac{6}{Tc^2 s}\right)\right\}\frac{1}{s}}$$

wherein said $\epsilon^{-sTc}$ is a delay element.

4. A control system according to claim 1, wherein when said controlled object and said disturbance each have a step function (1/s) whose relative degree is "1", and said response waveform f (t) is expressed by an attenuation sine wave, which is an exponential function, said control means further comprising:
   means for generating a transfer function Gf (s) of the control means, defined by the gain of the control means, to be expressed by the following equation:

$$G_f(s) = \frac{2\beta + \frac{\beta^2 + \omega_1^2}{s} - a(\beta^2 + \omega_1^2)(1 - \epsilon^{-sTc})}{1 + a(\beta^2 + \omega_1^2)\frac{(1 - \epsilon^{-sTc})}{s}}$$

wherein said $\epsilon^{sTc}$ is a delay element, "a" is a constant value, $\beta$ is an attenuation factor of the attenuation sine wave, and $\omega_1$ is an angular frequency.

5. A control system according to claim 1, wherein when said controlled object has function $1/\{(s+\omega c)s\}$ and said disturbance has a step function (1/s), and said response waveform f (t) is expressed by first and second attenuation sine waves, which are an exponential function, said control mean further comprising:
   means for generating a transfer function Gf (s) of the control means, defined by the gain of the control means, to be expressed by the following equation:

$$G_f(s) = \frac{\left\{\begin{array}{l}(\beta^2 + \omega_1^2 + \gamma^2 + \omega_2^2) + \left(2\beta + \frac{\beta^2 + \omega_1^2}{s}\right)\left(2\gamma + \frac{\gamma^2 + \omega_2^2}{s}\right) - \\ \{2(\beta + \gamma) - \omega c\}\omega c - a(\beta^2 + \omega_1^2)(\gamma^2 + \omega_2^2)\frac{s + \omega c}{s}(1 - \epsilon^{-sTc})\end{array}\right\}}{\left\{1 + \frac{2(\beta + \gamma) - \omega c}{2} + a(\beta^2 + \omega_1^2)(\gamma^2 + \omega_1^2)\frac{(1 - \epsilon^{-sTc})}{s^2}\right\}}$$

wherein said $\epsilon^{-sTc}$ is a delay element, "a" is a constant value, $\beta$ is an attenuation factor of the first attenuation sine wave, $\gamma$ is an attenuation factor of the second attenuation sine wave, $\omega_1$ is an angular frequency of the first attenuation sine wave, $\omega_2$ is an angular frequency of the second attenuation sine wave, and $\omega c$ is a cutoff angular frequency of the controlled object.

6. The controller according to claim 3, wherein said control means includes first to fourth linear amplifiers, first to third integrating means, first to fifth adding-subtracting means, and delay means, each of said amplifiers, integrating means, adding-subtracting means, and delay means having an output for outputting signals;
   said first linear amplifier receives said reference signal, linearly amplifies said reference signal with a ½ gain, and outputs the amplified signal to said first adding-subtracting means;
   said first adding-subtracting means subtracts the output signal of said delay means from the output amplified signal of said first linear amplifier, and outputs the subtracted signal to said first integrating means;
   said first integrating means integrates the output signal of said first adding-subtracting means by a transfer function 6/Tc²s, and outputs the integrated signal to said second adding-subtracting means;
   said second adding-subtracting means subtracts the output signal of said third adding-subtracting means from the output signal of said first integrating means, and outputs a subtracted signal, which is said control signal;
   said fourth adding-subtracting means subtracts said feedback signal and the output signal of said second integrating means from a step reference signal, and outputs the subtracted signal to said delay means and said second linear amplifier;
   said second integrating means integrates the output signal of said fifth adding-subtracting means by a step function 1/s, and outputs the integrated signal to said fourth adding-subtracting means;
   said delay means has a delay element of $(1-\epsilon^{-sTc})$, delays the output signal of said fourth adding-subtracting means in accordance with said delay element, and outputs the delayed signal to said first adding-subtracting means, said third linear amplifier, and said third integrating means;
   said third linear amplifier linearly amplifies the output signal of said fourth adding-subtracting means with a 6/Tc gain, and outputs the linear amplified signal to said third adding-subtracting means;
   said third integrating means integrates the output signal of said delay means by the transfer function 6/Tc²s, and outputs the integrated signal to said fifth adding-subtracting means;
   said fourth linear amplifier linearly amplifies the output signal of said delay means with a 2/Tc gain, and outputs the linearly amplified signal to said third adding-subtracting means; and
   said fifth adding-subtracting means adds the output signal of said third integrating means and that of said third adding-subtracting means, and outputs the added output signal to said second integrating means.

7. The controller according to claim 4, wherein said control means includes first and second linear amplifiers, first and second integrating means, first to fourth adding-subtracting means, and delay means delay means, each of said amplifiers, integrating means, adding-subtracting means, and delay means having an output for outputting a signal;
   said first linear amplifier receives said reference signal as a first reference signal, linearly amplifies said first reference signal with a Ka gain, and outputs the amplified signal to said first adding-subtracting means;
   said first adding-subtracting means subtracts the output signal of said second adding-subtracting means from the output the subtracted signal to said first integrating means;

said first integrating means integrates the output signal of said first adding-subtracting means by a transfer function Ki/S, and outputs the integrated signal to said third adding-subtracting means;

said third adding-subtracting means subtracts the output signal of said second linear amplifier from the output signal of said first integrating means, and outputs the subtracted signal to said fourth adding-subtracting means;

said fourth adding-subtracting means subtracts the output signal of said delay means from the output signal of the third adding-subtracting means, and supplies the subtracted signal, which is said control signal, to said controlled object;

said second adding-subtracting means subtracts the output signal of said second integrating means and a second reference signal supplied from an external source from said feedback signal from said controlled object, and outputs the subtracted signal to said first adding-subtracting means, said delay means, and said second linear amplifier;

said delay means has a delay element of $Kd(1-\epsilon^{-sTc})$, delays the output signal of said second adding-subtracting means in accordance with said delay element, and outputs the delayed value to said fourth adding-subtracting means and said second integrating means;

said second integrating means integrates the output signal of said delay means by the transfer function 1/S, and outputs the integrated signal to said second adding-subtracting means; and said second linear amplifier linearly amplifies the output signal of said second adding-subtracting means with a Kp gain, and outputs the amplified signal to said third adding-subtracting means, wherein said kp, ki, kd, and ka are respectively equal to $2\beta$, $\beta^2+\omega_1^2$, $a(\beta^2+\omega_1^2)$, and $(1+kd \cdot Tc)^{-1}$.

8. The controller according to claim 5, wherein said controller means includes first to fourth linear amplifiers, first to fifth integrating means, first to sixth adding-subtracting means, and delay means, each of said amplifiers, integrating means, adding-subtracting means and delay means each having an output for outputting a signal;

said first linear amplifier receives said reference signal as a first-reference signal, linearly amplifies said first reference signal with a Ka gain, and outputs the amplified signal to said first adding-subtracting means;

said first adding-subtracting means subtracts the output signal of second adding-subtracting means from the output value of said first linear amplifier, and outputs the subtracted signal to said first integrating means;

said first integrating means integrates the output signal of said first adding-subtracting means by a transfer function Ki2/S, and outputs the integrated signal to said third adding-subtracting means;

said third adding-subtracting means subtracts the output signal of said second linear amplifier from the output signal of said first integrating means, and outputs the subtracted signal to said fourth adding-subtracting means;

said fourth adding-subtracting means subtracts the output signal of said delay means from the output signal of the third adding-subtracting means, and outputs the subtracted signal to said fifth adding-subtracting means;

said fifth adding-subtracting means adds the output signal of said fourth adding-subtracting means and the output signal of said second integrating means, and outputs the added signal, which is said control signal, to said controlled object;

said sixth adding-subtracting means subtracts the output signal of said third integrating means and a second reference signal supplied from an external source, from said feedback signal output from said controlled object, and outputs the subtracted signal to said fourth integrating means, said third linear amplifier, said fourth linear amplifier, and said delay means;

said fourth integrating means integrates the output signal of said sixth adding-subtracting means by a transfer function $Ki_1/S$, and outputs the integrated signal to said second adding-subtracting means;

said third linear amplifier linearly amplifies the output signal of said sixth adding-subtracting means with a $Kp_1$ gain, and outputs the linear amplified signal to said second adding-subtracting means;

said fourth linear amplifier linearly amplifies the output signal of said sixth adding-subtracting means with a $(Kp_1+Ki_2)$ gain, and outputs the amplified signal to said fourth adding-subtracting means;

said delay means has a delay element of $Kd(1-\epsilon^{-sTc})$, delays the output signal of said sixth adding-subtracting means in accordance with said delay element, and outputs the delayed signal to said second integrating means and said fifth integrating means;

said second adding-subtracting means adds the output signal of said fourth integrating means and the output signal of said third linear amplifier, and outputs the added signal to said first adding-subtracting means and said second linear amplifier;

said second linearly amplifying linearly amplifies the output signal of said second adding-subtracting means with a $Kp_2$ gain, and outputs the amplified signal to said third adding-subtracting means;

said second integrating means integrates the output signal of said delay means by the transfer function $(s+\omega c)/s$, and outputs the integrated signal to said fifth adding-subtracting means; and said fifth integrating means integrates the output signal of said delay means by the transfer function 1/S, and outputs the integrated signal to said third integrating means, wherein said $Kp_1$, $Kp_2$, $Ki_1$, $Ki_2$, $Kd$, and $Ka$ are respectively equal to $2\beta$, $2\gamma$, $\beta^2+\omega_1^2$, $\gamma^2+\omega_2^2$, $a(\beta^2+\omega_1^2)(\gamma^2+\omega_2^2)$ and $[a(\gamma^2+\omega_2^2) Tc]^{-1}$.

* * * * *